United States Patent [19]
Mouchel et al.

[11] Patent Number: 5,173,024
[45] Date of Patent: Dec. 22, 1992

[54] FIXING ARRANGEMENT FOR MOUNTING AN ANNULAR MEMBER ON A DISK OF A TURBOSHAFT ENGINE

[75] Inventors: Jacques H. Mouchel, Paris; Jean-Claude C. Taillant, Evry, both of France

[73] Assignee: Societe Nationale D'Etude et de Construction de Moteurs D'Aviation, Paris, France

[21] Appl. No.: 721,838

[22] Filed: Jun. 26, 1991

[30] Foreign Application Priority Data

Jun. 27, 1990 [FR] France .................. 90 08068

[51] Int. Cl.$^5$ .............................................. F01D 5/32
[52] U.S. Cl. ............................... 416/220 R; 416/95
[58] Field of Search ......................... 416/220 R, 95

[56] References Cited

U.S. PATENT DOCUMENTS

| | | | |
|---|---|---|---|
| 2,988,325 | 6/1961 | Dawson | 416/220 R |
| 3,010,696 | 11/1961 | Everett | 416/97 R |
| 3,023,998 | 3/1962 | Sanderson, Jr. | 416/220 R |
| 4,019,833 | 4/1977 | Gale | 416/220 R |
| 4,021,138 | 5/1977 | Scalzo et al. | 416/220 R |
| 4,701,105 | 10/1987 | Cantor et al. | 416/95 |

FOREIGN PATENT DOCUMENTS

| | | | |
|---|---|---|---|
| 212963 | 2/1958 | Australia | 416/220 R |
| 0091865 | 10/1983 | European Pat. Off. | |
| 0214876 | 3/1987 | European Pat. Off. | |
| 2324873 | 4/1977 | France | |
| 2466610 | 4/1981 | France | |
| 2095763 | 10/1982 | United Kingdom | 416/220 R |

*Primary Examiner*—John T. Kwon
*Attorney, Agent, or Firm*—Oblon, Spivak, McClelland, Maier & Neustadt

[57] ABSTRACT

An annular member is attached coaxially to a disk of a turboshaft engine by mounting element comprising two separate sets of interengageable lugs, each set consisting of one ring of equi-angularly spaced lugs on the disk and another ring of equi-angularly spaced lugs on the annular member which is interengageable with the first ring by interleaving and overlapping the lugs of the two rings in bayonet fashion, the two sets of lugs being offset radially from each other and arranged so that they are interengageable simultaneously with each other. In addition the disk and the annular member are provided with substantially cylindrical coaxial surfaces which engage each other to ensure that the annular member is centered on the disk when the two sets of lugs are interengaged to attach the member to the disk.

7 Claims, 4 Drawing Sheets

018

FIXING ARRANGEMENT FOR MOUNTING AN ANNULAR MEMBER ON A DISK OF A TURBOSHAFT ENGINE

BACKGROUND OF THE INVENTION

1. Field of the invention

The invention relates to the mounting of an annular member on a disk of a turboshaft engine.

2. Summary of the prior art

One known fixing arrangement for this purpose is disclosed in French Patent Specification No. 2466610, and comprises a set of interengageable lugs consisting of a first ring of lugs provided on the disk and arranged such that the lugs of this first ring are spaced apart at regular angular intervals, and a second ring of lugs provided on the annular member and arranged such that the lugs of the second ring are also spaced apart at regular angular intervals, said first and second rings of lugs being arranged to be interleaved and then overlapped in order to provide a bayonet-type fixing of the annular member on the disk.

However, while this mounting arrangement may be sufficient to hold in place a relatively small annular member, such as the ring which retains the blades of the turbomachine disk as shown in the aforesaid French Specification No. 2466610, it would not be sufficiently rigid if it were to be used for mounting a larger annular member. Furthermore, no rotational locking means is provided to avoid the member becoming detached from the disk as a result of inadvertent rotation of the member relative to the disk. Also, the bulky nature of the parts shown in French Specification No. 2466610 will quite probably result in uneven expansion of the assembly during operation, which would be difficult to compensate for and to control.

SUMMARY OF THE INVENTION

According to the invention, there is provided an assembly comprising a disk of a turboshaft engine, an annular member, and mounting means for attaching said annular member coaxially to said disk, said mounting means comprising:

a first set of interengageable lugs consisting of a first ring of lugs provided on said disk and arranged such that said lugs of said first ring are spaced apart at regular angular intervals, and a second ring of lugs provided on said annular member and arranged such that said lugs of said second ring are also spaced apart at regular angular intervals, said first and second rings of lugs being arranged to be interleaved and then overlapped in order to provide a bayonet-type fixing of said annular member on said disk, a second set of interengageable lugs offset radially with respect to said first set and consisting of third and fourth rings of evenly spaced lugs provided on said disk and said annular member respectively, said lugs of said third ring being disposed at angular positions corresponding to the angular positions of said lugs of said first ring, and said lugs of said fourth ring being disposed at angular positions corresponding to the angular positions of said lugs of said second ring, whereby said third and fourth rings of lugs are interleaved and overlapped simultaneously with said first and second rings of lugs during fixing of said annular member on said disk, and centering means comprising a first substantially cylindrical surface on said disk coaxial with the axis of said disk, and a second substantially cylindrical surface on said annular member coaxial with the axis of said annular member, said first surface mating with said second surface to centre said annular member on said disk when said annular member is attached to said disk.

Preferably the cylindrical surface of either the annular member or the disk is formed on a first thin flexible wall which is integral with the said member or disk.

The first thin wall is preferably coaxial with the axis of the disk, and either the first or the second set of lugs is disposed in the proximity of said first thin wall.

Preferably a second thin flexible wall is formed integrally with the annular member, this second thin wall being distinct from said first thin wall, and preferably the other of the first and second sets of lugs is disposed in the proximity of said second thin wall.

In the case where the disk carries a plurality of blades distributed evenly around the periphery of the disk, each of the blades having a root by which the blade is attached to the disk, the root of each blade preferably has an axial projection which is arranged to extend into a space between two adjacent pairs of overlapped lugs of said first or second set of lugs when the annular member is mounted on the disk and the first and second sets of lugs are each interengaged in said bayonet fashion, thereby locking said annular member rotationally to the disk.

The main advantages of a mounting arrangement in accordance with the invention, particularly when embodying the preferred features mentioned above, lie in the ease of assembly and disassembly, a reduction in the number of parts needed for the mounting and therefore also in a reduction in the weight of the assembly, in maintaining the assembly without any play between the annular member and the disk, and also in the attainment of a certain deadening of vibrations.

Further features and advantages of the invention will become apparent from the following description of a preferred embodiment with reference to the drawings and given by way of example.

DESCRIPTION OF THE PREFERRED EMBODIMENT

Figure 1:
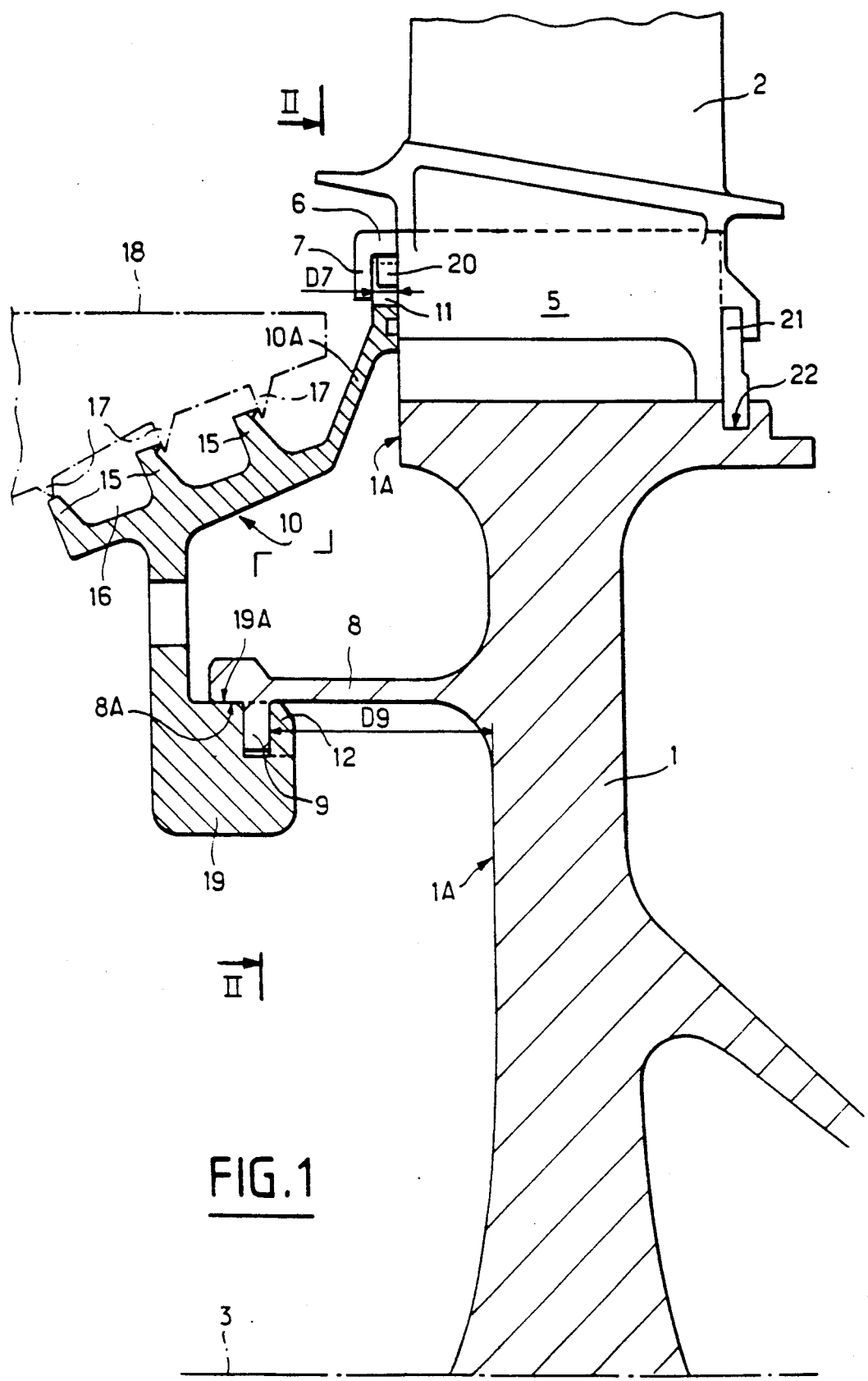
FIG. 1 is a cross-section through part of a preferred embodiment of an assembly in accordance with the invention, in which an annular labyrinth sealing member is mounted on a rotor disk of a turboshaft engine, the section being taken on the line I—I in FIG. 2.
Figure 2:
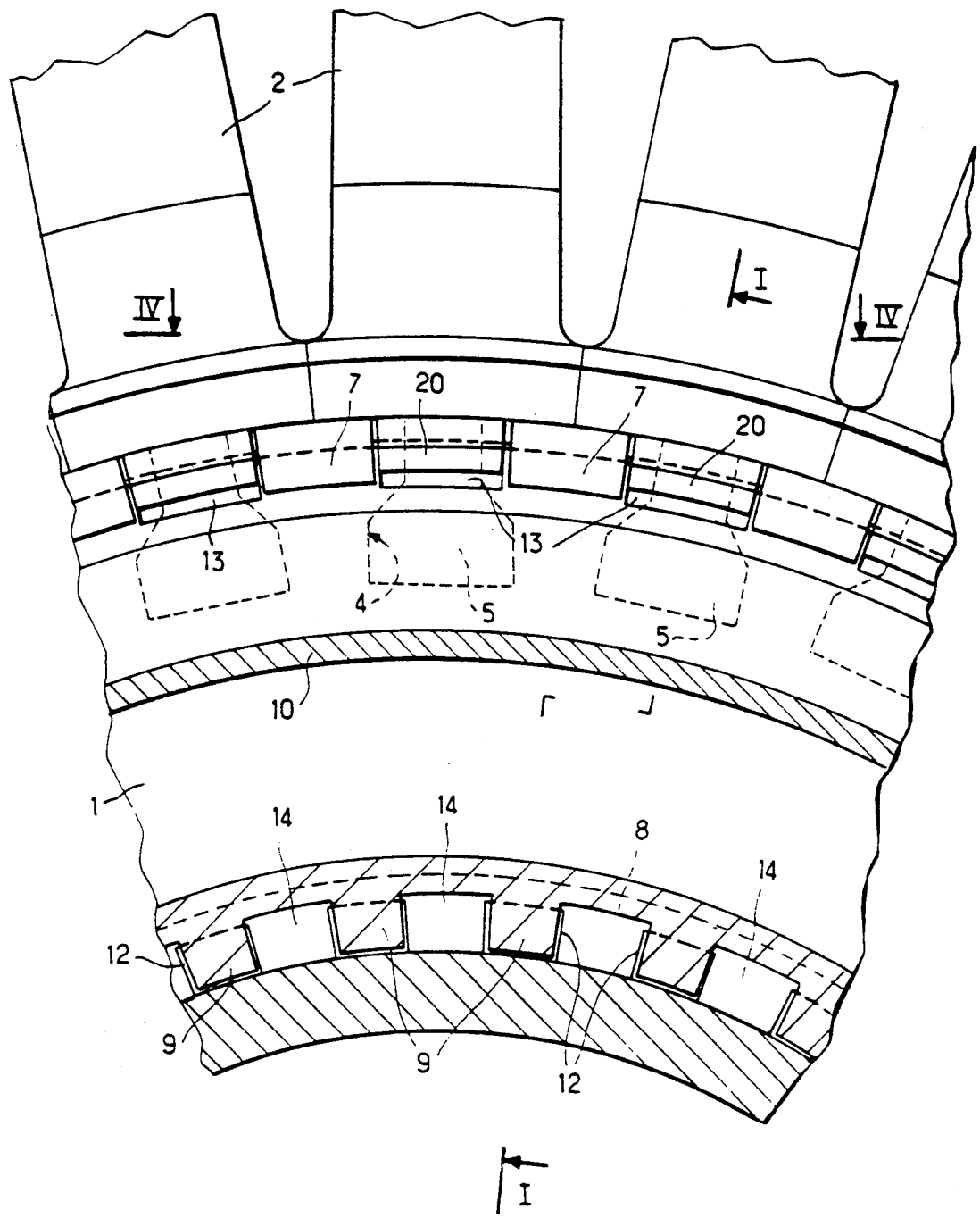
FIG. 2 is a partial radial section through the assembly taken on the line II—II in FIG. 1.

FIG. 1 shows a solid rotor disk 1 of a turbojet engine, the disk carrying blades 2 and being mounted to rotate in relation to a casing (not shown) about its geometrical axis 3. As FIG. 2 shows, the disk 1 extends generally perpendicularly to the axis 3 and has dovetail-shaped recesses 4 evenly distributed around its periphery for receiving the roots 5 of the blades 2.

The disk 1 carries a first ring of evenly spaced lugs 7 on one of its transverse faces 1A close to the periphery of the disk, the lugs 7 being spaced a distance D7 from the face 1A by portions 6 and being directed radially inwards to lie substantially parallel to the face 1A. In addition, the disk 1 has an integral, cylindrical, thin flexible wall 8 projecting from its face 1A coaxially with the axis 3 at a position radially inwards of the first ring of lugs 7. This wall 8 is flexible radially and carries a further ring of inwardly directed lugs 9 lying substantially parallel to the face 1A, the lugs 9 being spaced therefrom by a distance D9. These lugs 9 are spaced apart at regular angular intervals corresponding to the lugs 7 of the first ring so that the lugs 9 are in fact radially aligned with the lugs 7.

The end of the thin wall 8 is machined on its radially inner side to form a cylindrical bearing surface 8A coaxial with the axis 3.

Figure 4:
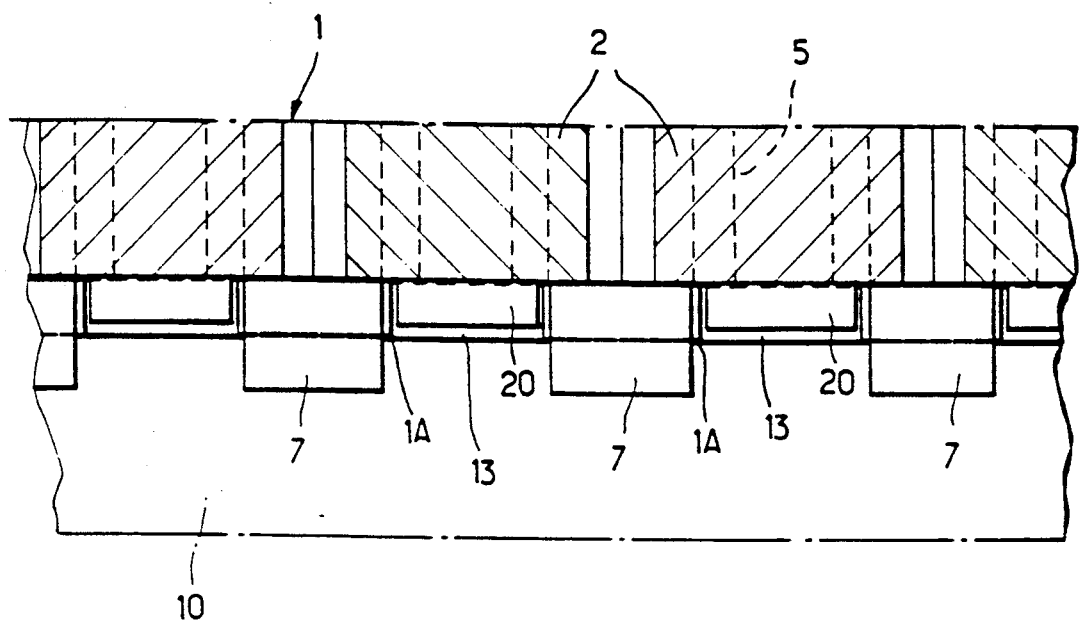
FIG. 4 is a part sectional, part plan view taken on the line IV—IV in FIG. 2.

The assembly also comprises an annular member 10 carrying two further rings of lugs 11 and 12 for cooperation respectively with the rings of lugs 7 and 9 on the disk. For this purpose the lugs 11 and 12 all lie substantially parallel to the face 1A of the disk 1 and are radially outwardly directed. The lugs of each ring 11,12 are spaced apart at regular angular intervals corresponding to the lugs of the rings 7,9 of the disk 1 in such a way that the lugs 11 are radially aligned with the lugs 12 and are capable of being positioned opposite the gaps 13 between successive lugs of the ring 7, while the lugs 12 are simultaneously positioned opposite the gaps 14 between successive lugs of the ring 9. This arrangement is illustrated in FIG. 4.

Figure 3:
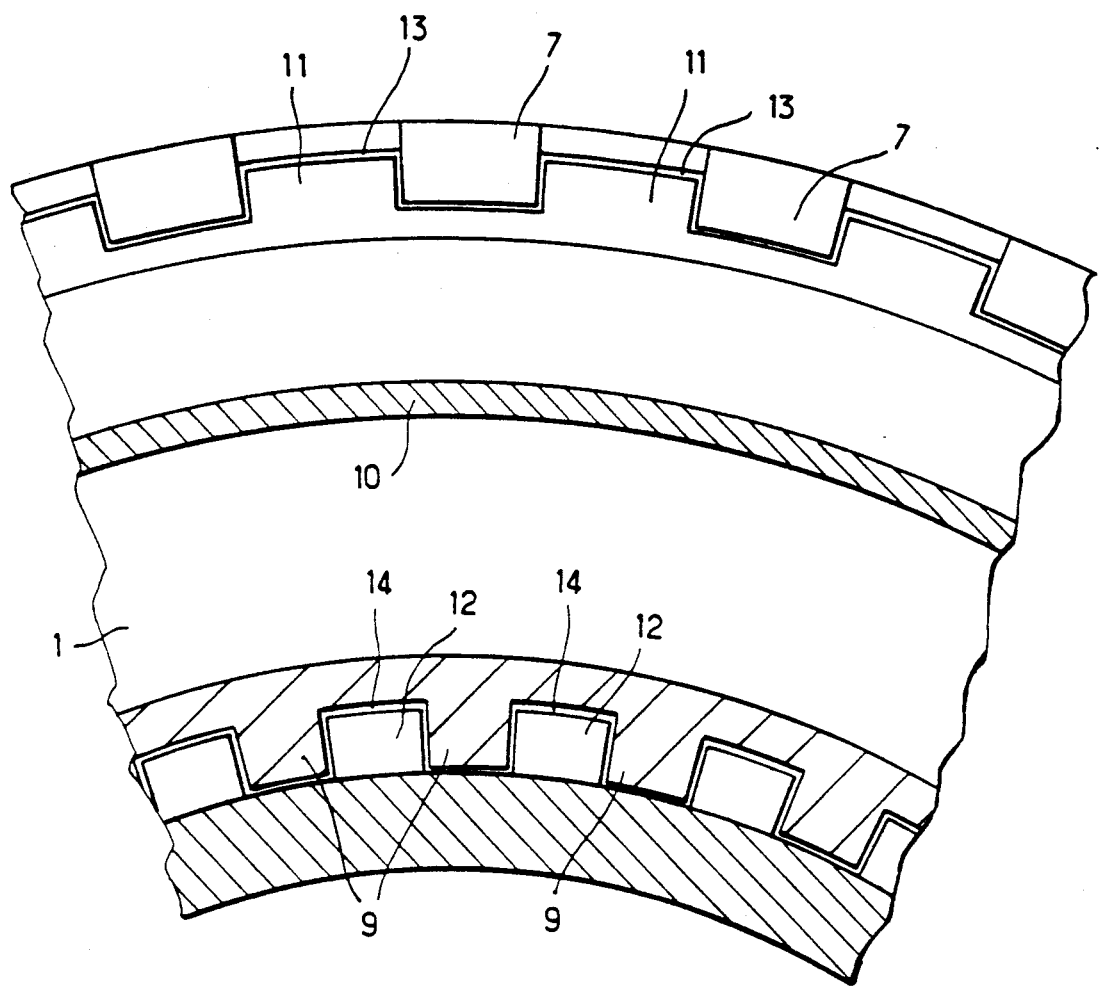
FIG. 3 is a view similar to that of FIG. 2 but showing the arrangement prior to completion of the assembly, the annular member being shown presented in front of the disk with its lugs positioned to interleave with the lugs o the disk.

From this position the annular member 10 can be fixed in bayonet fashion to the disk 1 by moving the member 10 axially towards the disk so that the lugs 11,12 are simultaneously inserted into the gaps 13,14 respectively to a position axially beyond the lugs 7,9, and by then rotating the member 10 so as to move the lugs 11,12 behind the lugs 7,9 respectively as shown in FIG. 3.

In this embodiment the annular member 10, which is coaxial with the disk axis 3, carries on a radially outer face a number of circumferentially extending sealing tongues 15 for cooperation with further annular sealing tongues 17 carried by the casing 18 of the rotor to form a labyrinth seal 16.

As shown in FIG. 1, the annular member 10 has a solid, relatively rigid inner end 19 and a thin flexible wall portion 10A near its outer end.

The solid inner end 19 of the annular member 10 carries the ring of lugs 12, and also comprises a cylindrical surface 19A which is coaxial with the axis 3 and which is arranged to engage and cooperate with the surface 8A on the thin wall 8 of the disk 1 in order to centre the member 10 on the disk 1 when they are assembled.

The thin flexible wall 10A of the member 10 is situated close to the ring of lugs 11, which are disposed at the outer end of the member 10, and therefore separate the lugs 11 from the other ring of lugs 12 carried by the member 10. The wall 10A is substantially frustoconical and provides a degree of axial flexibility.

The root 5 of each blade 2 is provided with an axial projection 20 on its side which, after the blade 2 has been mounted on the disk 1, is close to the face 1A of the disk 1. When the assembly is completed (FIGS. 1,2 and 4) this axial projection 20 extends beyond the plane of the face 1A and into the gap 13 separating two successive pairs of the overlapped lugs 7 and 11, thus serving to prevent rotation of the member 10 relative to the disk 1 and hence inadvertent uncoupling of the member from the disk 1.

On the opposite side of the disk 1 from the face 1A, the blades 2 are held in position by virtue of their roots 5 being retained in their respective recesses 4 in the periphery of the disk 1 by means of an axial locking ring 21 inserted into a groove 22 in the disk 1.

The arrangement which has just been described has the following advantages:

easy mounting (and demounting) of the annular member 10 on the disk 1 by means of a simple bayonet-type fixing simultaneously actuated for both sets of interengaging lugs 7,11 and 9,12, and rotational locking by means of axial projections 20 on the blade roots 5 effected by the conventional mounting of the blades 2 on the disk;

achievement of a strong mounting through the use of two separate sets of interengaging lugs 7,11 and 9,12, ensuring satisfactory retention of the annular member 10 on the disk 1;

achievement of satisfactory centering of the annular member 10 in relation to the axis 3 of the disk 1 by means of interengaging precision bearing surfaces 8A and 19A;

achievement of an assembly which can accommodate possibly differing expansions of the disk 1 and the annular member 10 without excessive stress and consequently without the need to use excessive thicknesses of material, this being made possible in the radial direction by reason of the first thin flexible wall 8 and in the axial direction by the second thin flexible wall 10A, the small thickness of these walls 8 and 10A permitting a certain deformation in the said directions;

similarly, achievement of good axial and radial integrity of the attached parts throughout the operating temperature range, due to deformations of the flexible walls; and damping and filtering of certain vibrations by means of slight friction between the parts (annular member 10 and disk 1) which are not rigidly connected.

In addition, the assembly described has a small number of component parts which results in a lightness unknown prior to the invention.

It will of course be appreciated that the invention is not confined to the particular embodiment described herein, but is intended to embrace all possible variations which might be made to it without departing from either the scope or spirit of the invention.

We claim:

1. An assembly comprising a disk of a turboshaft engine, an annular member, and mounting means for attaching said annular member coaxially to said disk, said mounting means comprising:

a first set of interengageable lugs including a first ring of lugs Provided on said disk and arranged such that said lugs of said first ring are spaced apart at regular angular intervals, and a second ring of lugs provided on said annular member and arranged such that said lugs of said second ring are also spaced apart at regular angular intervals, said first and second rings of lugs being arranged to be interleaved and then overlapped in order to provide a bayonet-type fixing of said annular member on said disk, a second set of interengageable lugs offset radially with respect to said first set and including third and fourth rings of evenly spaced lugs provided on said disk and said annular member respectively, said lugs of said third ring being disposed at angular positions corresponding to the angular positions of said lugs of said first ring, and said lugs of said fourth ring being disposed at angular positions corresponding to the angular positions of said lugs of said second ring, whereby said third and fourth rings of lugs are interleaved and overlapped simultaneously with said first and second rings of lugs during fixing of said annular member on said disk, and centering means comprising a first substantially cylindrical surface on said disk coaxial with the axis of said disk, and a second substantially cylindrical surface on said annular member coaxial with the axis of said annular member, said first surface mating with said second surface to centre said annular member on said disk when said annular member is attached to said disk.

2. An assembly according to claim 1, wherein one of said disk and said annular member includes a first thin flexible wall integral therewith, and one of said first and second substantially cylindrical surfaces is formed on said first wall.

3. An assembly according to claim 2, wherein said first thin wall is coaxial with the axis of said disk.

4. An assembly according to claim 2, wherein one of said first and second sets of interengageable lugs is disposed in the proximity of said first thin wall.

5. An assembly according to claim 4, wherein said annular member includes a second thin flexible wall integral therewith, said second thin wall being separate from said first thin wall.

6. An assembly according to claim 5, wherein one of said first and second sets of interengageable lugs is disposed in the proximity of said second thin wall, and wherein the set of lugs disposed proximate to the second thin wall is different from the set of lugs proximate to said first thin wall.

7. An assembly according to claim 1, wherein said disk carries a plurality of blades distributed evenly around the periphery of said disk, each of said blades having a root by which said blade is attached to said disk, and an axial projection on said root which is arranged to extend into a space between two adjacent pairs of overlapped lugs of one of said first and said second sets of lugs when said annular member is mounted on said disk and said first and second sets of lugs are each interengaged in said bayonet fashion, thereby locking said annular member rotationally to said disk.

* * * * *

UNITED STATES PATENT AND TRADEMARK OFFICE
CERTIFICATE OF CORRECTION

PATENT NO. : 5,173,024

DATED : December 22, 1992

INVENTOR(S) : Mouchel et al.

It is certified that error appears in the above-identified patent and that said Letters Patent is hereby corrected as shown below:

Column 2, line 56, change "o" to --on--.

Column 4, line 57, change "Provided" to --provided--.

Signed and Sealed this

Sixteenth Day of November, 1993

*Attest:*

BRUCE LEHMAN

*Attesting Officer*    *Commissioner of Patents and Trademarks*